United States Patent
Kazmi et al.

(10) Patent No.: US 8,145,206 B2
(45) Date of Patent: Mar. 27, 2012

(54) WIRELESS TELECOMMUNICATIONS SYSTEMS

(75) Inventors: Muhammad Ali Kazmi, Bromma (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 931 days.

(21) Appl. No.: 12/092,288

(22) PCT Filed: Nov. 2, 2005

(86) PCT No.: PCT/EP2005/011694
§ 371 (c)(1),
(2), (4) Date: May 1, 2008

(87) PCT Pub. No.: WO2007/051480
PCT Pub. Date: May 10, 2007

(65) Prior Publication Data
US 2008/0233948 A1    Sep. 25, 2008

(51) Int. Cl.
H04W 24/00 (2009.01)
H04W 36/00 (2009.01)
H04W 72/00 (2009.01)
H04W 4/00 (2009.01)
H04B 15/00 (2006.01)
H04B 7/216 (2006.01)
H04J 3/00 (2006.01)
G06F 15/16 (2006.01)
G06F 15/173 (2006.01)

(52) U.S. Cl. ........ 455/423; 455/501; 455/436; 455/450; 455/466; 370/320; 370/338; 370/336; 709/229; 709/226; 709/235

(58) Field of Classification Search .......... 455/450, 455/423, 501, 466; 370/338, 336.2; 709/229, 709/226, 235
See application file for complete search history.

(56) References Cited

U.S. PATENT DOCUMENTS

| | | | | |
|---|---|---|---|---|
| 6,628,924 | B1 * | 9/2003 | Miyamoto | 455/69 |
| 7,193,978 | B2 * | 3/2007 | Ishikawa et al. | 370/320 |
| 2006/0217137 | A1 * | 9/2006 | Kushalnagar et al. | 455/501 |
| 2006/0223538 | A1 * | 10/2006 | Haseba et al. | 455/436 |

FOREIGN PATENT DOCUMENTS

WO    WO 00/38348 A1    6/2000

OTHER PUBLICATIONS

X. Lagrange, P. Godlewski, S. Tabbane: "Reseaux GSM des principes a la norme (pp. 289-304 )" Feb. 1, 2000, Hermes Science, Paris, XP002390S06 ; p. 289, line 5—p. 295, line 19.

\* cited by examiner

Primary Examiner — Dwayne Bost
Assistant Examiner — Timothy Pham

(57) ABSTRACT

A method for controlling uplink transmissions from a user device to an access point in a wireless telecommunications system is described. Each access point defines a communications cell, and the method comprises monitoring interference in an uplink channel at an access point, performing interference control actions at the access point when monitored interference exceeds a first predetermined level, monitoring occurrences of such control actions at the access point, and if a number of such occurrences exceeds a predetermined level, performing interference control actions with reference to a plurality of cells at a central controller of the telecommunications system, which central controller is operable to control a plurality of access points.

16 Claims, 3 Drawing Sheets

WIRELESS TELECOMMUNICATIONS SYSTEMS

The present invention relates to wireless telecommunications systems, and, in particular, but not exclusively, to Evolved Universal Terrestrial Radio Access (UTRA) wireless telecommunications systems.

BACKGROUND OF THE INVENTION

A very simplified wireless telecommunications system 1 is illustrated in FIG. 1 of the accompanying drawings. A user device 3 is operable to communicate in a wireless manner with an access point 5, via an air interface 7. It will be readily appreciated that the apparatus illustrated in FIG. 1 is merely intended to explain the operation of a wireless system, and should not be construed as limiting. In particular, the mobile user device 3 and the access point 5 may be provided by any suitable means known to those skilled in the art, and should not be limited to the apparatus illustrated in FIG. 1 of the accompanying drawings.

In an uplink, from the mobile user device 3 to the access point 5, transmission is performed by the user device 3 using either a contention-based channel or a scheduled channel. In contention-based transmission, the access point 5 transmits scheduling information (physical channels etc) to the user device 3 on a shared physical channel. In scheduled-based transmission, the access point 5 transmits scheduling information to the user device 3 on a dedicated channel. The key point is that the access point 5 controls the scheduling of data packets in the uplink.

Wireless systems that require high spectrum efficiency preferably need to allow reuse of channels in adjacent cells or groups of cells. For example, a so-called "1-reuse" system is one where each cell is able to use the full range of channels. A "3-reuse" system groups 3 cells together for channel allocation purposes. Consequently, different user devices 3 in adjacent cells may use the same uplink sub-carrier/chunk frequencies in such systems.

When the user device 3 transmits at high power in a cell and/or is close to a neighbouring cell, it is likely that transmission from the user device 3 will cause excessive interference in the neighbouring cell. This can lead to bad uplink macro-diversity performance. This is clearly undesirable because it leads to degraded overall performance and/or reduced capacity.

The issue of uplink inter-cell interference is well known and several solutions have been proposed. Known "radio resource management (RRM)" techniques include:
  Dynamic Channel Allocation (DCA)
  Fractional Load (FL)
  Load Balancing (LB)

Dynamic channel allocation is powerful technique to reduce both intra-cell and inter-cell interference. Existing DCA techniques do not consider long-term management of interferers. That is, existing DCA techniques mitigate the interference problem by assigning/re-assigning sub-carrier frequencies to user devices on a short time scale in such a manner that the interference level is kept at close-to-optimum values. The important aspect is that the "optimum" is typically defined assuming the given user device and traffic distribution in the area which is in the scope of the DCA technique. That is, it is out of the scope of existing DCA techniques to:
  Take into consideration of longer term interference events, for instance the repeated occurrence of high interference on certain sub-carrier frequencies.
  Perform actions taking place by virtue of the interaction between different Radio Access Nodes that aim to balance the load among adjacent cells such that the root cause of the interference is mitigated.

Fractional Load is a well-known technique to reduce intercell interference. Typically, FL refers to the technique of using only a subset of the available sub-carriers in each cell and thereby reducing the probability of different user devices using the same sub-carriers. In fact, FL creates a greater-than-one reuse system, which renders it non-applicable in evolved UTRA networks.

Evolved UTRA networks can also be known as Super 3G (S3G) networks. The $3^{rd}$ Generation Partnership Program (3GPP) currently standardising future wireless network techniques.

Load Balancing is a well-documented RRM technique. The basic idea is to distribute the load among cells and sectors of a cellular system in such a manner that multi-cell/sector resources are highly utilized. LB is inherently connected to the definition of load, since it creates the basis of the actual algorithm that attempts to distribute load in the system. For instance, LB can re-assign user devices by enforcing handovers such that parts of the incoming uplink traffic in highly loaded cells are "taken over" by less loaded cells. In these solutions, the LB triggering event is typically some measurement that characterizes load (incoming bit-rate, used sub-carriers or other radio resources) rather than the frequency occurrence of undesired events such as high measured interference levels of other short-term events.

Such known techniques are described in the following papers:

I Katzela and M Naghshineh, "Channel Assignments Schemes for Cellular Mobile Telecommunications Systems: A Comprehensive Survey", IEEE Personal Communications, pp. 10-31, June 1996

Y J Zhang and K Ben Latalef, "Multi-user Adaptive subcarrier-and-Bit Allocation With Adaptive Cell Selection for OFDM Networks", IEEE Trans. Wireless Comm., Vol 3, No. 5, pp 1556-1575, September 2004

Y J Zhang and K Ben Latalef, "Adpative Resource Allocation and Scheduling for Multi-user Packet-based OFDM Networks", IEEE International Conference on Communications (ICC) 2004

S Das, H Viswanathan, G Rittenhouse, "Dynamic Load Balancing Through Coordinated Scheduling in Packet Data Systems", IEEE Infocom 2003

A Sang, X Wang, M Madihian, R D Gitlin, "A Load Aware Handoff and Cell-site Selection Scheme in Multi-cell Packet Data Systems", IEEE Globecom 2004

A Sang, X Wang, M Madihian, R D Gitlin, "Coordinated Load Balancing, Handoff/Cell-site Selection and Scheduling in Multi-cell Packet Data Systems", ACM Mobicom 2004

In summary, existing techniques do not provide solutions that:
  Provide immediate solution/reduction of interference when interference levels on certain sub-carriers get high (short time scale problem)
  Take anticipatory actions, based on the short time scale events, to prevent such undesired events occur
  Avoid long-term actions that are not necessary/desired. This is important, because unnecessary load balancing actions, for example increase the probability of unnecessary handovers, may increase transport network load and may even cause undesired "ping-pong"-ing effects.

Ensure coordinated interaction between different radio access nodes such as the access point and a central controller to control uplink interference.

SUMMARY OF THE PRESENT INVENTION

The basic concept of the invention is summarized in the following two aspects:

Allow the short and long-term Radio Resource Management (RRM) techniques to interact with one another. That is, the short term events (high interference levels at some sub-carriers) should be taken into account on the longer time scale.

Make the long term (load balancing) actions depend on the actual occurrence of undesired events rather than relying on measured load values device 3s. The basic rationale for this is that it is the actual occurrence of certain events that call for actions, not the overall load in cells.

The basic idea is that a central controller (for instance a Radio Network Controller (RNC)) directs an access point to monitor the uplink interference (uplink quality etc.) on all frequency carriers or chunks in a way that the interference level on all the frequencies in the system remains within an acceptable level. There are two main actions to be carried out: short term and long term.

According to one aspect of the invention, there is provided a method for controlling uplink transmissions from a user device to an access point in a wireless telecommunications system, each access point defining a communications cell, the method comprising monitoring interference in an uplink channel at an access point, performing interference control actions at the access point when monitored interference exceeds a first predetermined level, monitoring occurrences of such control actions at the access point, and if a number of such occurrences exceeds a predetermined level, performing interference control actions with reference to a plurality of cells at a central controller of the telecommunications system, which central controller is operable to control a plurality of access points.

The control actions at the access point may include preventing use of a channel, minimising use of a channel, allocating a predetermined minimum bit rate for a channel, and/or scheduling a channel with a predetermined probability.

The control actions at the central controller may include suspension of a channel, or suspension of a selected number of channels.

At least some control actions may be ended when monitored interference in a cell falls below a second predetermined level. Indeed, all control actions may be ended when monitored interference in a cell falls below the second predetermined level. The second predetermined level may equal the first predetermined level.

According to another aspect of the present invention there is provided an access point for use in a wireless telecommunication system which includes at least one user device operable to transmit data to an access point over an uplink, a plurality of access points defining respective cells, and a central controller operable to control a plurality of access points, the access point comprising a channel interference control unit operable to monitor interference in an uplink channel, to perform interference control actions for an associated cell when monitored interference in that cell exceeds a predetermined level, to monitor occurrences of such control actions for the associated cell, and, if a number of such occurrences exceeds a predetermined level, to refer control to a central controller which is operable to perform interference control actions with reference to a plurality of cells.

According to another aspect of the present invention, there is provided a controller for controlling a plurality of access points in a wireless telecommunications system which includes at least one user device and a plurality of access points defining respective cells, the controller comprising interference control unit operable to perform control actions with reference to a plurality of cells in response to receipt of an indication from an access point that such control actions are required, such control actions serving to reduce interference in at least one cell.

According to another aspect of the present invention, there is provided a wireless telecommunications system comprising:
   at least one user device;
   a plurality of access point defining respective cells, a user device being operable to transmit data to an access point on an uplink defined by the access point; and
   a central controller operable to control the plurality of access points, wherein at least one access point is operable to monitor interference in an uplink channel, to perform interference control actions for an associated cell when monitored interference in that cell exceeds a predetermined level, to monitor occurrences of such control actions, and, if a number of such occurrences exceeds a predetermined level, to refer control to the central controller, the central controller being operable to perform interference control actions with reference to a plurality of cells.

DETAILED DESCRIPTION OF THE PREFERRED EMBODIMENTS

The problem addressed by the present invention can be summarised as follows.

Consider a multi-cell cellular system with reuse-1. User devices are randomly distributed within the coverage area of the system and each would like to transmit data in an uplink. The task is to devise a mechanism (algorithm and supporting control plane signalling) that assigns dynamically user devices to access points and assigns channels, such as sub-carrier frequencies, to user devices such that inter-cell interference is minimized, in such a way that the overall system capacity can be maximized.

Figure 1:
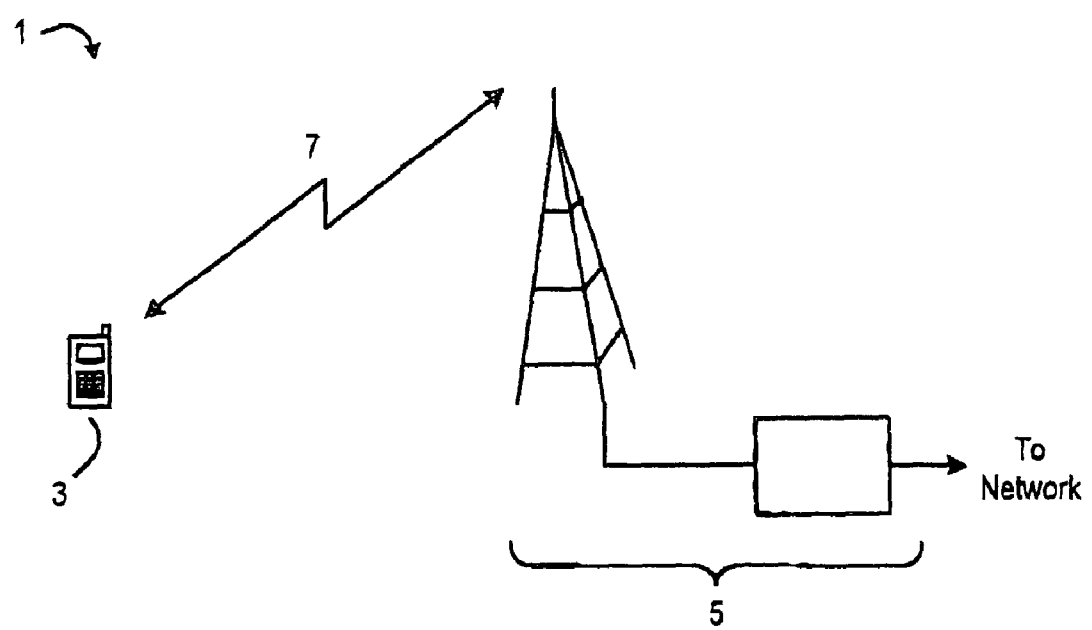
FIG. 1 illustrates a wireless telecommunications system.
Figure 2:
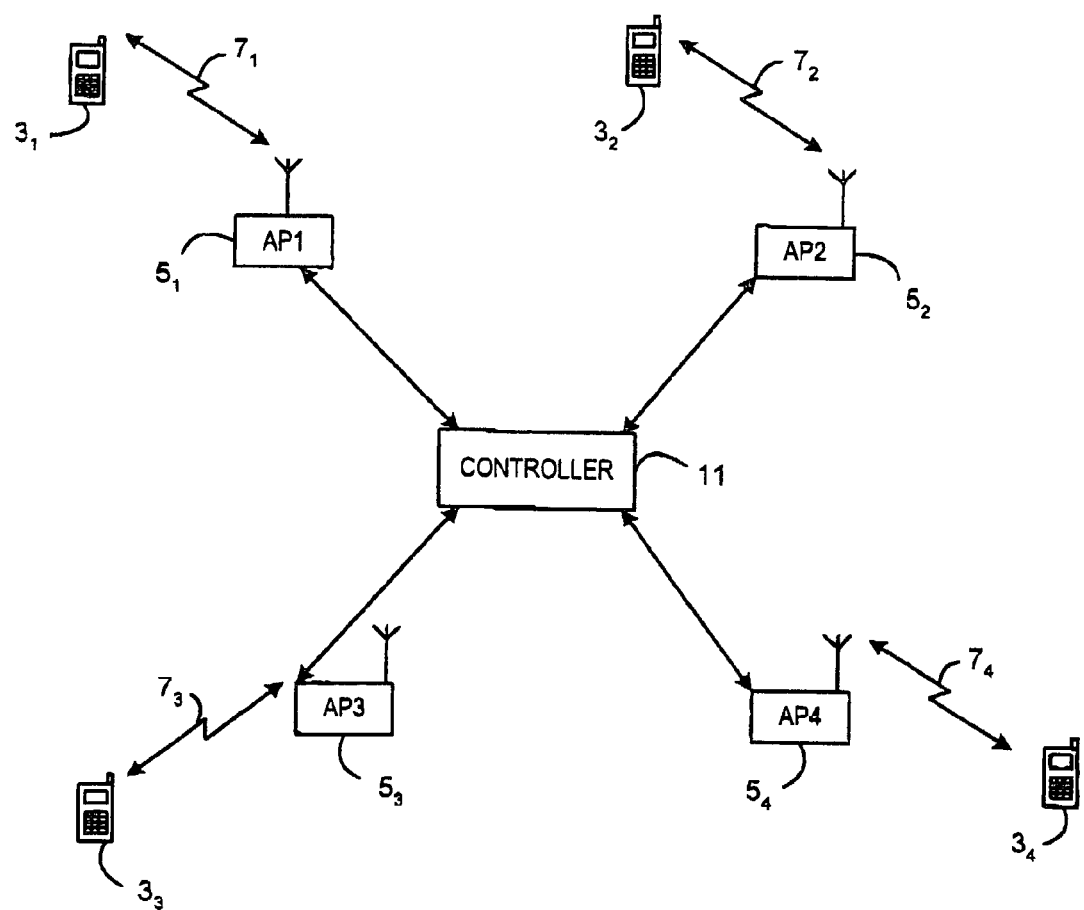
FIG. 2 illustrates a cellular wireless telecommunications system embodying one aspect of the present invention.

Such a system is illustrated simply in FIG. 2, in which a central controller 11, such as a radio network controller (RNC), operates to control a number of access points AP1 . . . APN $5_1 \ldots 5_n$. Each access point $5_m$ defines a communications cell 5 in which communications are performed with respective user devices $3_m$.

In each cell, the access point $5_m$ schedules transmissions from user devices $3_m$ by assigning one or more channels (e.g. frequency carriers/chunks) for the uplink to the user device concerned. The access points are under the control of the central controller 11. The same channels can be used in neighbouring cells, and so when user devices $3_m$ on a cell edge need to transmit at high power, interference in the neighbouring cell can result. This leads to bad uplink macro-diversity performance.

The central controller 11 indicates to each access point $5_m$ the allowed uplink interference per channel. Each access point measures uplink interference (Received Signal Strength (RSS), Signal-to-Interference-Noise Ratio (SINR) etc.) on each channel over a first time period (T1) specified by the central controller 11. When the uplink interference increases beyond the allowed limit over the first time period (T1), the access point concerned takes short-term action to reduce the interference. If the interference continues, then the central controller 11 takes long-term action to reduce it.

The definition of the first time period T1 determines how conservative the interference control technique is to be. The shorter this period is, the more frequent the reporting of channel interference will be. Accordingly, with a relatively short period T1, the number of interventions by the access point to control interference levels will be relatively high.

Short-term actions are carried out autonomously by the access point $5_m$, which avoids or minimizes use of such channels (whose interference is above specified limit) during subsequent frames/scheduling turns. More specifically, the access point $5_m$ either forbids the use of such channels or allocates only a predetermined minimum bit rate ($R_{min}$) to the user device $3_m$ on these channels. Another possibility is that the access point $5_m$ schedules such channels with certain probability ($P_1$). The probability $P_1$ determines the probability that a given channel is allocated in a cell. For example, a probability value of zero means that the channel is blocked. As the probability value rises, then the opportunity for the channel to be reused rises. $P_1$ can be set by the access point 5 itself, or could be set by the central controller 11.

The short-term actions performed by the access point can be seen as single cell control actions. That is, the access point controls channels within its own cell in order to reduce interference in that cell. A side effect of this control might be that interference in neighbouring cells is also reduced.

A straightforward way for the access point to communicate the channel control information is to broadcast an indication flag (for example, use: +1, don't use: 0, use minimum rate: −1) or a transmission probability ($P_2$) for such channels. Hence, the user device is either not allowed to transmit or allowed to transmit with certain minimum bit rate ($R_{min}$) or allowed to transmit with certain probability ($P_2$) on these channels. $P_2$ can be set by the access point 5 itself or could be set by the central controller 11.

When the access point 5 has to carry out short-term actions repeatedly (e.g. repeated avoidance of the use of channels) due to uplink interference greater than the specified limit over a second time period $T_2$ ($T_2 \gg T_1$), then the following actions are performed.

The access point $5_m$ reports this event $E_1$ (i.e. information related to those carriers whose interference level is beyond the limit) to the central controller 11, which in turn executes a load-balancing mechanism such as temporarily suspending the use of those channels in some cells or set some probability ($P_3$) with which those channels can be used. The central controller 11 can use any of the following options to suspend the use of such channels.

The central controller 11 may suspend channels whose aggregate interference is above certain limit.

The central controller 11 may suspends only N worst channels out of reported M channels (M≧N).

The central controller 11 thus undertakes multiple cell control actions that control channels across an appropriate number of cells.

The access point $5_m$ can also periodically report the uplink interference to the central controller 11 on all or a selection of channels specified by the controller 11. In this case, the controller may also specify the reporting period.

The central controller 11 restores the use of channels whose interference condition improves. The central controller 11 can infer interference reduction on the channels if the access point $5_m$ does not report event $E_1$ over another time period $T_s$. Another possibility is that the access point $5_m$ explicitly indicates to the central controller 11 about the interference reduction on the previously suspended channels.

Figure 3:
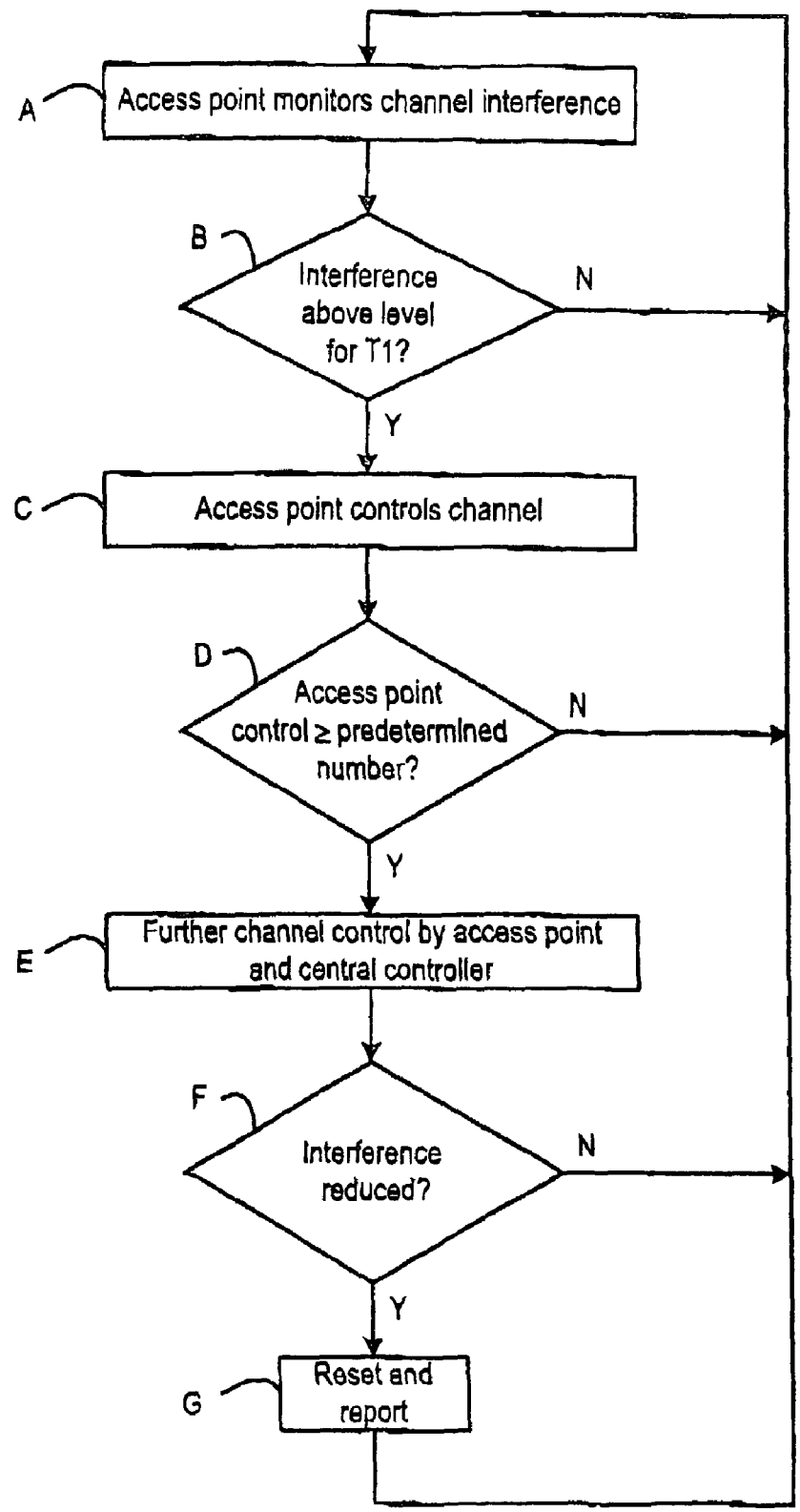
FIG. 3 illustrates a method embodying another aspect of the present invention.

FIG. 3 is a flow diagram illustrating steps in a method embodying another aspect of the present invention. At step A, the access point $5_m$ monitors the interference levels in uplink channels. If the interference level is determined (step B) to be higher than a predetermined level for a predetermined time period T1, then the access point $5_m$ adopts a short term channel control strategy (event E1) to reduce the interference on the channel concerned (step C).

If it is determined (step D) that a channel has required control from the access point for a predetermined number of timers or more during the second predetermined time period T2, then the access point notifies the central controller 11 that longer term interference control is required (event E2).

When event E2 occurs, the access point controls uplink scheduling on the particular sub-carrier during the next scheduling turn, and reports to the central controller 11 that the number of interference events has exceeded a threshold value. Preferably, the access point prevents transmission on the channel concerned when reporting to the central controller 11. In response to the notification received from the access point, the central controller 11 triggers multi-cell actions. In particular, the central controller 11 can suspend the use of the affected sub-carriers in some cells.

If no further interference events occur during the multi-cell control (step F), then the count of such events is reset (step G) and reported by the access point to the central controller 11.

When the uplink interference stays under a predetermined level for at least a predefined period of time T3, the access point reports this event to the central controller.

The second time period T2 plays an important role in defining occurrence of the second event E2. T2 indicates the interval during which at least a predetermined level of E1 events must happen in order for the second event E2 to occur. T2 is a sliding window ranging from the current time instant back to T2 in the past. The longer this "memory" of the system, the greater is the likelihood that E2 is actually triggered. Again, if T2 is large the system tends to be conservative, since E2 (which is reported to the controller 11) triggers actions both in the access point and the controller.

Period T2 effectively measures the time under which the particular sub-carrier must be "good" (i.e., no E1 events) in order for the reset event (step G) to happen. The reset event is an indication (reported to the central controller) that the particular sub-carrier is in "good condition".

The proposed mechanism requires signalling over the interface between the AP and the RNC.

The mechanism requires Master/Centralized node, such as a central controller, that has radio information.

The proposed mechanism can also be applicable to a distributed Radio Access Network (RAN) architecture with mesh links with a Master access point. Such a master access point is a logical entity that provides all or some of the functionality of the central controller The uplink interference per carrier will remain within the limit, improving system capacity. In systems with frequency reuse-1 the uplink interference is critical, which is mitigated by the proposed coordinated load balancing method.

A particular advantage of the proposed solution is that uplink macro-diversity (soft handover) will become feasible since the signal received from the same user device 3 at different access points will not be marked by excessive interference.

The invention claimed is:

1. A method for controlling uplink transmissions from a user device to an access point in a wireless telecommunications system, the access point defining a communications cell, the method comprising:
    monitoring interference in an uplink channel at an access point,
    performing interference control actions at the access point when monitored interference exceeds a first predetermined level, wherein the interference control actions performed at the access point include preventing use of a channel, minimising use of a channel, allocating a predetermined minimum bit rate for a channel, and/or scheduling a channel with a predetermined probability,
    monitoring occurrences of the interference control actions at the access point, and
    in response to determining that a number of occurrences of the interference control actions performed at the access point exceeds a predetermined level, performing interference control actions with reference to a plurality of cells at a central controller of the telecommunications system, which central controller is operable to control a plurality of access points, wherein the interference control actions performed at the central controller include suspension of a channel or suspension of a selected number of channels.

2. The method of claim 1, wherein at least some control actions are ended when monitored interference in a call falls below a second predetermined level.

3. The method of claim 2, wherein all control actions are ended when monitored interference in a cell falls below the second predetermined level.

4. The method of claim 2, wherein the second predetermined level equals the first predetermined level.

5. An access point for use in a wireless telecommunication system which includes at least one user device operable to transmit data to an access point over an uplink, a plurality of access points defining respective cells, and a central controller operable to control a plurality of access points, the access point comprising:
    a channel interference control unit operable to:
    monitor interference in an uplink channel,
    perform interference control actions for an associated cell when monitored interference in that cell exceeds a predetermined level, wherein the interference control actions at the access point include preventing use of a channel, minimising use of a channel, allocating a predetermined minimum bit rate for a channel, and/or scheduling a channel with a predetermined probability,
    monitor occurrences of the interference control actions for the associated cell, and
    in response to determining that a number of occurrences of the interference control actions for the associated cell exceeds a predetermined level, refer control to a central controller which is operable to perform interference control actions with reference to a plurality of cells, wherein the interference control actions include suspension of a channel or suspension of a selected number of channels.

6. The access point of claim 5, operable to end at least some control actions when monitored interference in a cell falls below a second predetermined level.

7. The access point of claim 6, operable to end all control actions when monitored interference in a cell falls below the second predetermined level.

8. The access point of claim 6, wherein the second predetermined level equals the first predetermined level.

9. A controller for controlling a plurality of access points in a wireless telecommunications system which includes at least one user device and a plurality of access points defining respective cells, the controller comprising an interference control unit operable to perform interference control actions with reference to a plurality of cells in response to receipt of an indication from an access point that a number of occurrences of interference control actions performed at the access point exceeds a predetermined level, wherein the interference control actions performed at the access point include preventing use of a channel, minimising use of a channel, allocating a predetermined minimum bit rate for a channel, and/or scheduling a channel with a predetermined probability, and wherein the interference control actions performed with reference to a plurality of cells include suspension of a channel and suspension of a selected number of channels.

10. The controller of claim 9, wherein at least some control actions are ended when monitored interference in a cell falls below a second predetermined level.

11. The controller of claim 10, wherein all control actions are ended when monitored interference in a cell falls below the second predetermined level.

12. The controller of claim 10, wherein the second predetermined level equals the first predetermined level.

13. A wireless telecommunications system comprising:
    at least one user device;
    a plurality of access points defining respective cells;
    a user device being operable to transmit data to an access point on an uplink defined by that access point; and
    a central controller operable to control the plurality of access points, wherein at least one access point is operable to:
    monitor interference in an uplink channel,
    perform interference control actions for an associated cell when monitored interference in that cell exceeds a predetermined level,
    monitor occurrences of the interference control actions for the associated cell, and
    in response to determining that a number of occurrences of the interference control actions performed for the associated cell exceeds a predetermined level, to refer control to the central controller, the central controller being operable to perform interference control actions with reference to a plurality of cells, wherein the interference control actions performed at the central controller include suspension of a channel or suspension of a selected number of channels.

14. The system of claim 13, operable to end at least some control actions when monitored interference in a cell falls below a second predetermined level.

15. The system of claim 14, operable to end all control actions when monitored interference in a cell falls below the second predetermined level.

16. The system of claim 14, wherein the second predetermined level equals the first predetermined level.

* * * * *